(12) United States Patent (10) Patent No.: US 8,553,405 B2
Sun (45) Date of Patent: Oct. 8, 2013

(54) DUMMY HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/280,353

(22) Filed: Oct. 25, 2011

(65) Prior Publication Data
US 2013/0033811 A1 Feb. 7, 2013

(30) Foreign Application Priority Data
Aug. 4, 2011 (CN) .......................... 2011 1 0222090

(51) Int. Cl.
*G06F 1/16* (2006.01)
*H05K 5/00* (2006.01)
*H05K 7/00* (2006.01)

(52) U.S. Cl.
USPC .................................................... 361/679.33

(58) Field of Classification Search
None
See application file for complete search history.

(56) References Cited

U.S. PATENT DOCUMENTS

| | | | | |
|---|---|---|---|---|
| 5,488,538 A | * | 1/1996 | Wakita | 361/679.31 |
| 6,418,011 B2 | * | 7/2002 | Omori | 361/679.33 |
| 2002/0044416 A1 | * | 4/2002 | Harmon et al. | 361/685 |
| 2003/0011980 A1 | * | 1/2003 | Albrecht et al. | 361/685 |
| 2003/0206372 A1 | * | 11/2003 | Warmenhoven | 360/133 |

* cited by examiner

*Primary Examiner* — Hoa C Nguyen
*Assistant Examiner* — Xanthia C Cunningham
(74) *Attorney, Agent, or Firm* — Altis & Wispro Law Group, Inc.

(57) ABSTRACT

A dummy hard disk drive (HDD) is for arrangement in an electronic device. The dummy HDD includes a top plate, a first side plate, a bottom plate, and a second side plate which can be formed into either a rigid box, or into a thick flat plate.

18 Claims, 8 Drawing Sheets

DUMMY HARD DISK DRIVE

CROSS-REFERENCE TO RELATED APPLICATION

Relevant subject matter is disclosed in a pending U.S. patent application with application Ser. No. 13/221,857, filed on Aug. 30, 2011 and entitled "DUMMY HARD DISK DRIVE", which is assigned to the same assignee as this patent application.

BACKGROUND

1. Technical Field

The present disclosure relates to a dummy hard disk drive (HDD) for an electronic device.

2. Description of Related Art

An electronic device, such as a computer or a server, usually includes a plurality of brackets for mounting HDDs. A dummy HDD is usually fitted in each bracket to avoid the bracket from being deformed or damaged when manufacturing or transporting these brackets. When a real HDD is received in the bracket, the dummy HDD will be taken out. However, a traditional dummy HDD is often a fixed structure, and not foldable, which causes a waste of space when the dummy HDD is boxed and transported.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
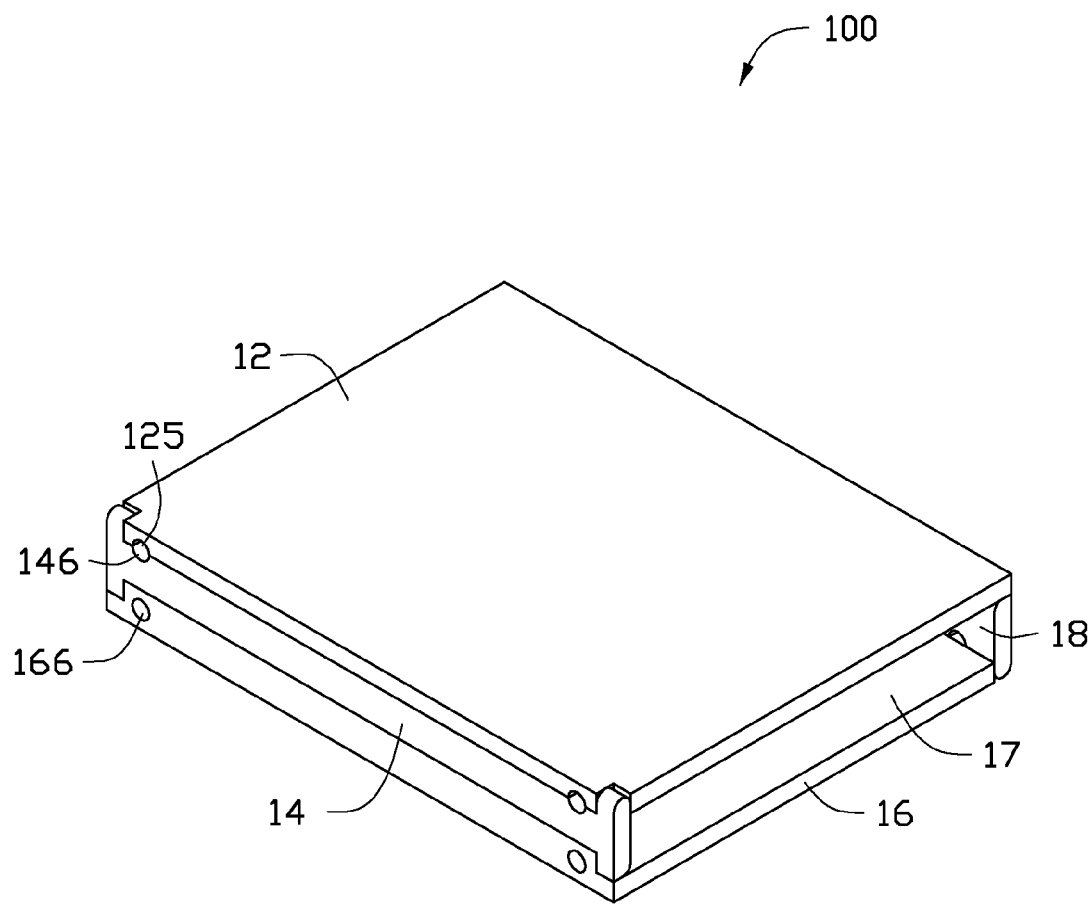
FIG. 1 is an isometric view of an embodiment of an assembled dummy hard disk drive (HDD).
Figure 2:
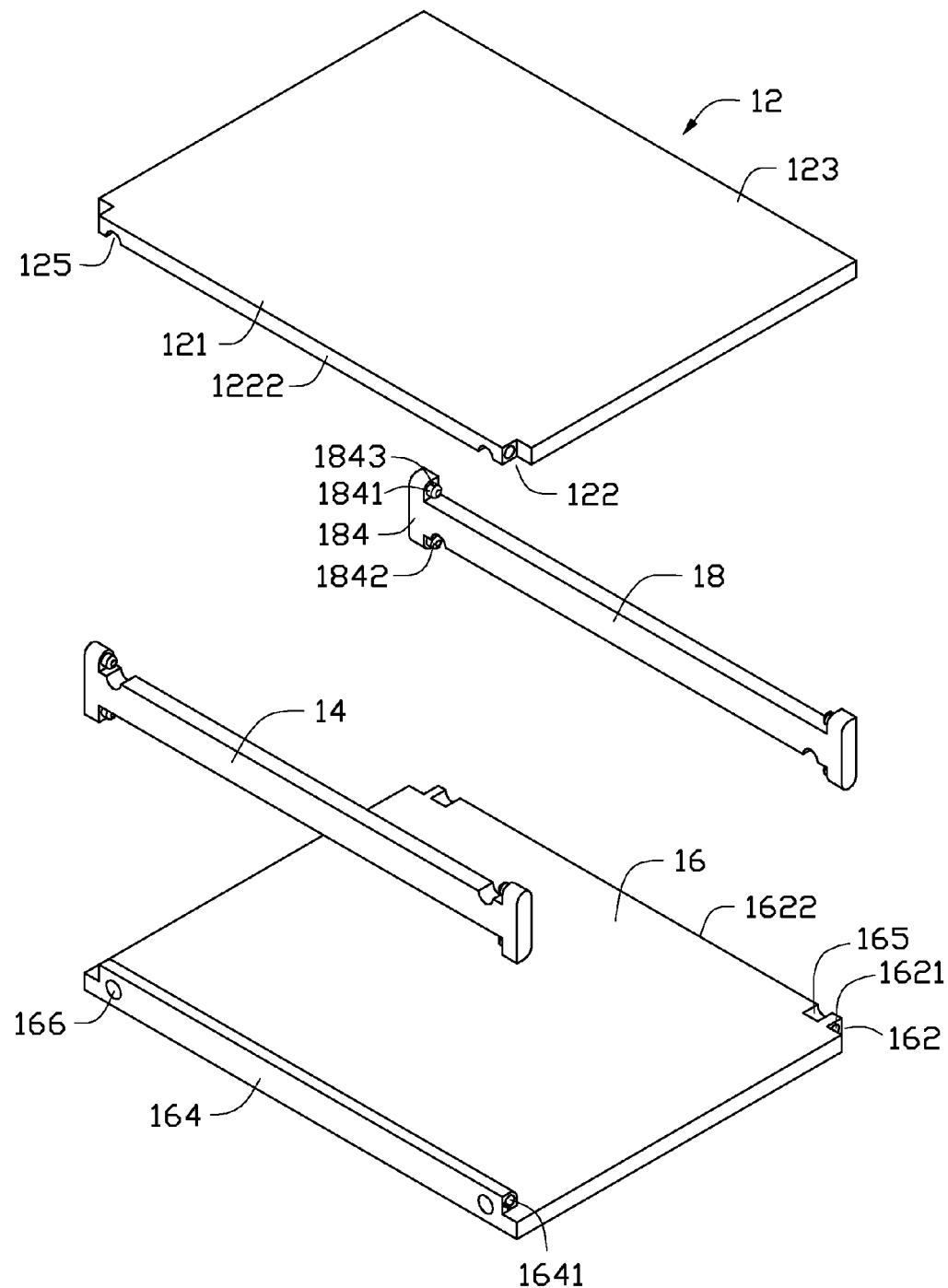
FIG. 2 is an exploded, isometric view of FIG. 1.
Figure 3:
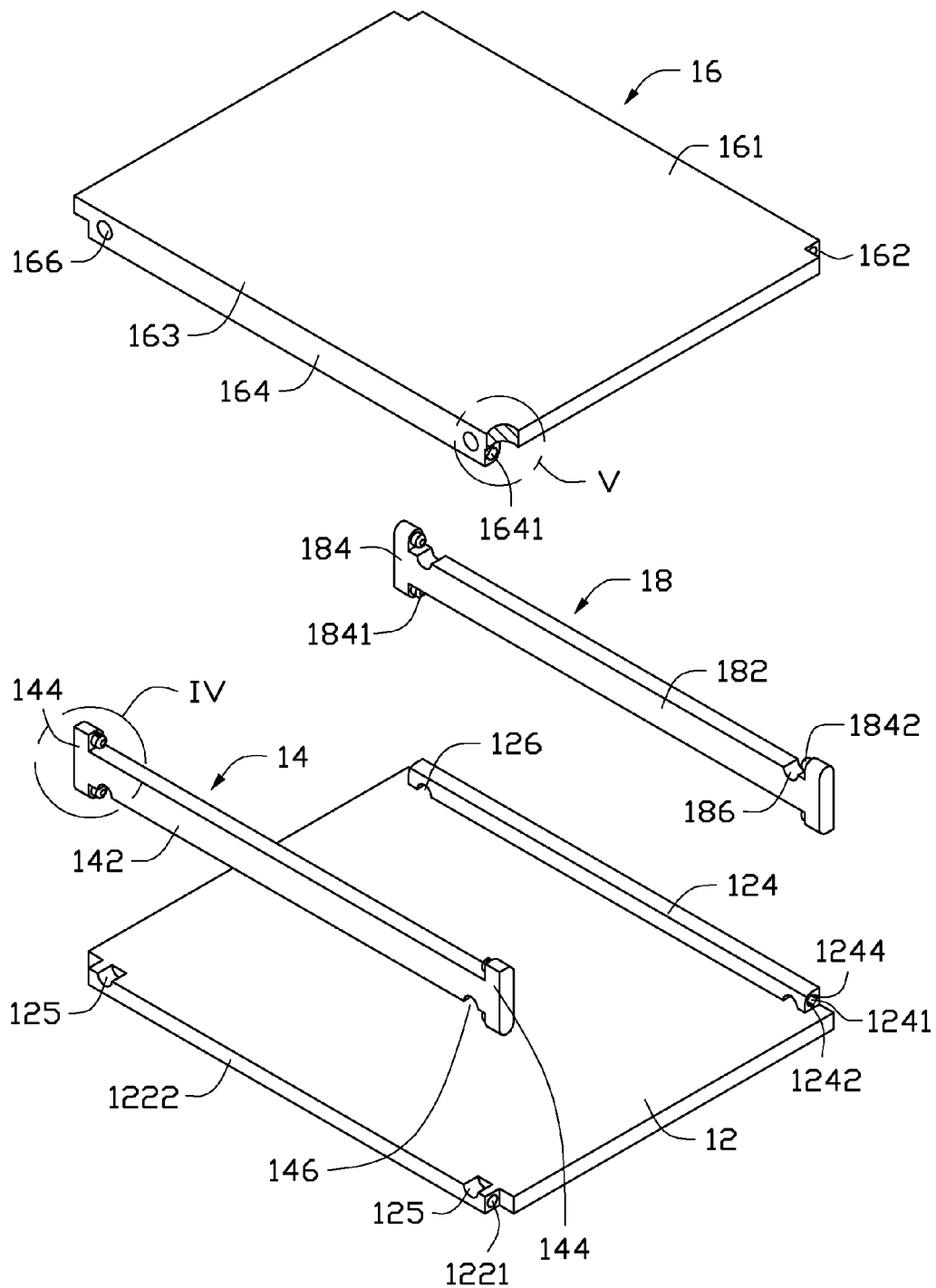
FIG. 3 is an inverted view of FIG. 2.
Figure 4:
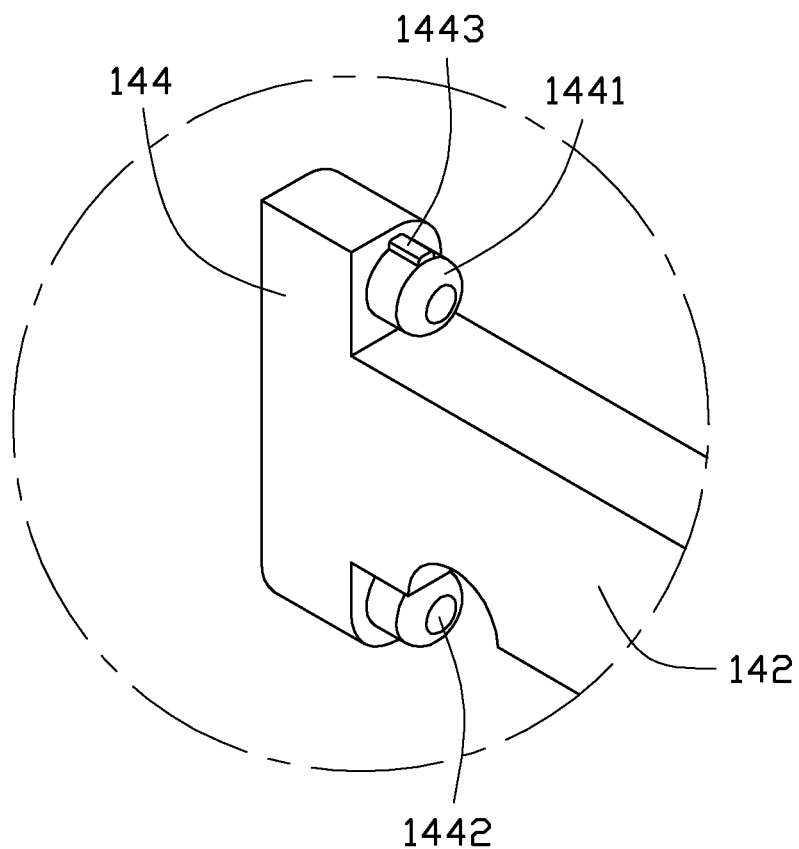
FIG. 4 is an enlarged view of the circled portion IV of FIG. 3.
Figure 5:
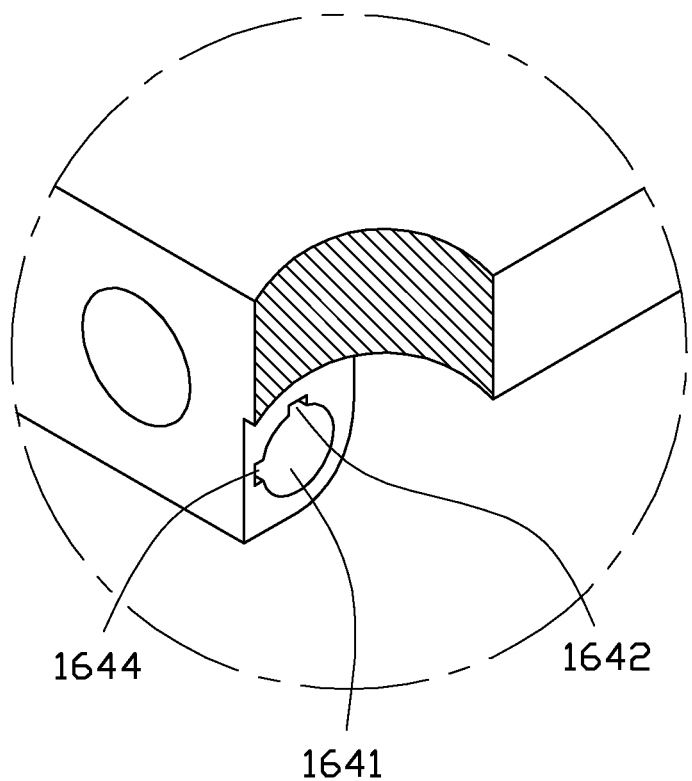
FIG. 5 is an enlarged view of the circled portion V of FIG. 3.

Referring to FIG. 1, an embodiment of a dummy hard disk drive (HDD) 100 includes a top plate 12, a first side plate 14, a bottom plate 16, and a second side plate 18. The top plate 12 is parallel to the bottom plate 14. The length and width of the top plate 12 and the bottom plate 16 are the same as those of an actual HDD. The first side plate 14 is parallel to the second side plate 18. The top plate 12, the first side plate 14, the bottom plate 16, and the second side plate 18 are made of resilient material, such as rubber or plastic.

Referring to FIGS. 2-5, two cutouts 122 are defined in opposite ends of a first side 121 of the top plate 12. The first side 121 forms a flange 1222 between the cutouts 122. Each end of the flange 1222 defines a longitudinal pivot hole 1221. At the edge 123, a bar-shaped protrusion 124 protrudes perpendicularly from the underside of the top plate 12. A second pivot hole 1241 is defined in each end of the protrusion 124. A first positioning slot 1242 and a second positioning slot 1244 are defined in the inner surface bounding one of the second pivot holes 1241. The first positioning slot 1242 is angled about 90 degrees from the second positioning slot 1244. The first positioning slot 1242 and the second positioning slot 1244 are intended to function as an anti-rotation arrangement. The flange 1222 defines a blind semicircular slot (slot 125) at each end of the flange 1222. Two mounting through holes 126 are defined at each end of the junction of the top plate 12 and the protrusion 124.

The bottom plate 16 is identical to the top plate 12. Two cutouts 162 are defined in opposite ends of a first side 161 of the bottom plate 16. The first side 161 forms a flange 1622 between the cutouts 162. Each end of the flange 1622 defines a longitudinal pivot hole 1621. At the edge 163, a bar-shaped protrusion 164 protrudes perpendicularly from the underside of the top plate 16. A second pivot hole 1641 is defined in each end of the protrusion 164. A first positioning slot 1642 and a second positioning slot 1644 are defined in the inner surface bounding one of the second pivot holes 1641. The first positioning slot 1642 is angled about 90 degrees from the second positioning slot 1644. The first positioning slot 1642 and the second positioning slot 1644 are intended to function as an anti-rotation arrangement. The flange 1622 defines a blind semicircular slot (slot 165) at each end of the flange 1622. Two mounting through holes 166 are defined at each end of the junction of the top plate 16 and the protrusion 164.

The first side plate 14 is substantially the shape of an uppercase "I", and includes a bar 142 and two connecting portions 144 formed on opposite ends of the bar 142. Each connecting portion 144 includes a first pin 1441 and a second pin 1442 extending toward the other connecting portion 144 and at opposite sides of the bar 142. The first pin 1441 forms a flexible raised portion 1443 on the circumference of the first pin 1441, for engagement in either the first positioning slot 1642 or the second positioning slot 1644, to achieve the anti-rotation function mentioned above. The bar 142 defines a semicircular cutout 146 adjacent to each of the second pins 1442.

The second side plate 18 is identical to the first side plate 14. The second plate 18 is substantially I-shaped, and includes a bar 182 and two connecting portions 184 formed on opposite ends of the bar 182. Each connecting portion 184 includes a first pin 1841 and a second pin 1842 extending toward the other connecting portion 184 and at opposite sides of the bar 182. The first pin 1841 forms a flexible raised portion 1843 on the circumference of the first pin 1841, for engagement in either the first positioning slot 1242 or the second positioning slot 1244, to achieve the anti-rotation function mentioned above. The bar 182 defines a semicircular cutout 186 adjacent to each of the connecting portions 184.

Referring to FIG. 1, in assembly, the top plate 12, the first side plate 14, the bottom plate 16, and the second side plate 18 to be connected head-to-tail to form a hollow rectangular frame with openings 17. The size and shape of the frame are the same as an actual HDD, thereby forming the dummy HDD 100. Each of the first pins 1441 is pivotably engaged in a second pivot hole 1641. Each of the second pins 1442 is pivotably engaged in a first pivot hole 1221. Each of the first pins 1841 is pivotably engaged in a second pivot hole 1241. Each of the second pins 1842 is pivotably engaged in a first pivot hole 1621. The bars 142 and 182 are sandwiched between the top plate 12 and the bottom plate 16.

In a first state of use as shown in FIG. 1, the raised portion 1843 is engaged in the first positioning slot 1242 to position the top plate 12 perpendicular to the second side plate 18. The raised portion 1443 is engaged in the first positioning slot 1642 to position the first side plate 14 perpendicular to the bottom plate 16. Thus the dummy HDD 100 becomes a rectangular frame.

Figure 6:
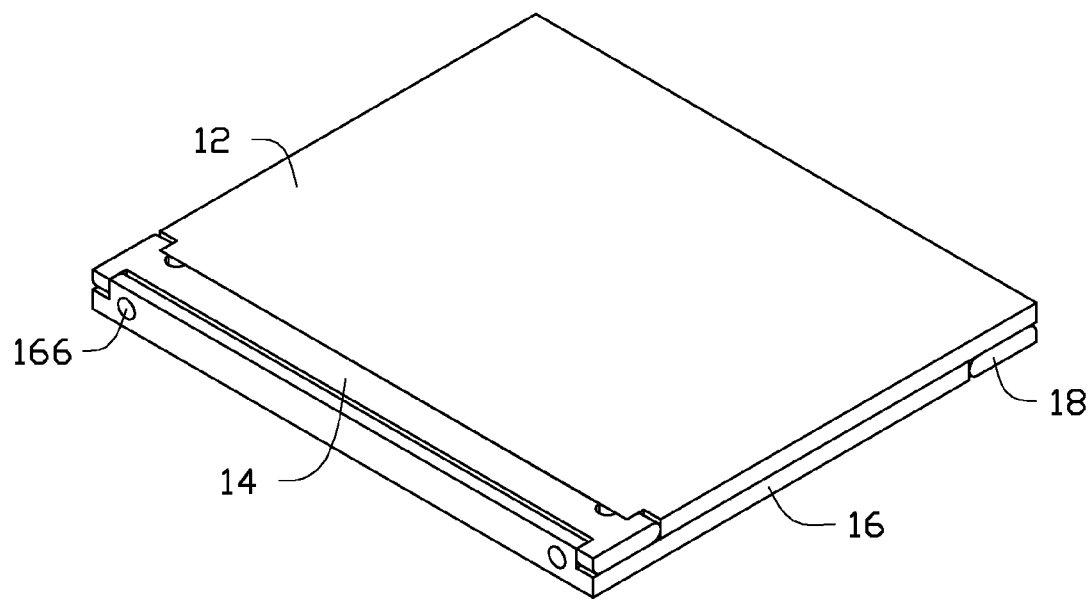
FIGS. 6 and 7 show different states of use of the dummy HDD of FIG. 1.
Figure 7:
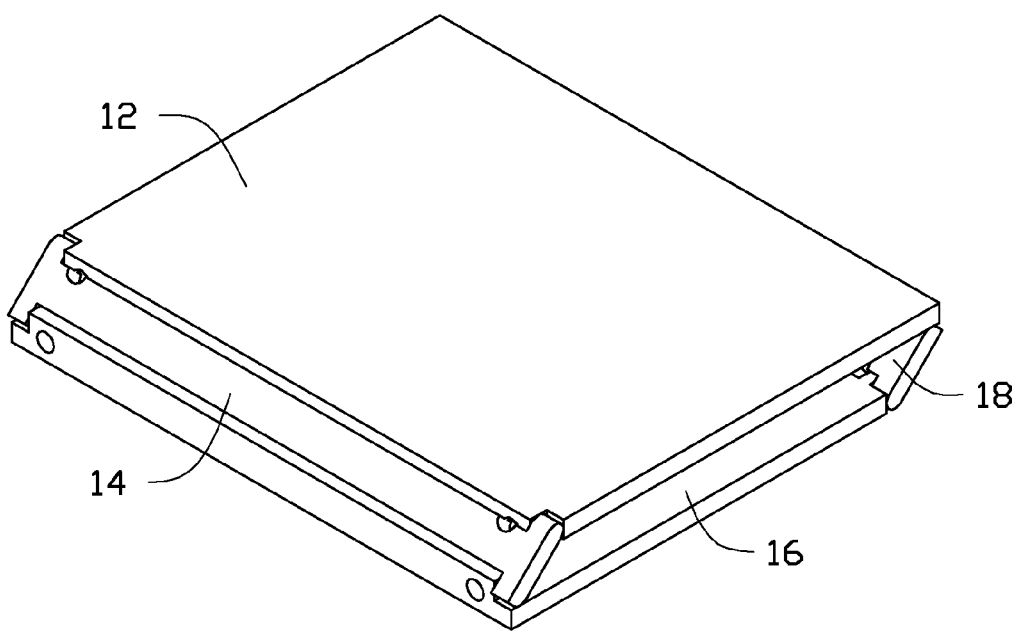

Referring to FIG. 6 and FIG. 7, rotating the first side plate 14 and the second side plate 18 relative to the deformable plates 12 and 16, the dummy HDD 100 first assumes the shape of a parallelogram (shown in FIG. 7). The side plates 14 and 18 close towards the plates 12 and 16. In the second state of use as shown in FIG. 6, the top plate 12 is flat on the bottom plate 16, and each side plate is coplanar with a plate. Thus the frame is folded with first side plate 14 and the top plate 12 contacting second side plate 18 and the bottom plate 16. The raised portion 1843 is engaged in the second positioning slot 1244 to position the bottom plate 16 coplanar with the second side plate 18. The raised portion 1443 is engaged in the second positioning slot 1644 to position the first side plate 14 coplanar with the top plate 12. Thus the dummy HDD 100 may be folded, to occupy the minimum space, and to present a robust structure against collisions and mishandling.

Figure 8:
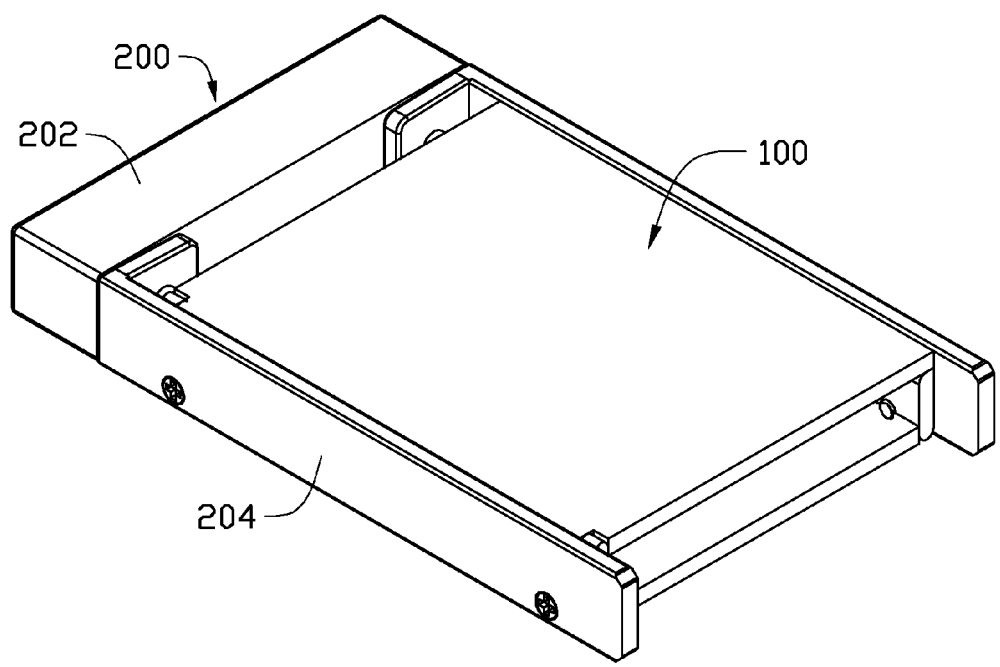
FIG. 8 is an isometric view showing a state of use when the dummy HDD is mounted to an electronic device.

Referring to FIG. 8, an electronic device 200 includes a base 202 and two parallel sidewalls 204 extending from the base 202. The dummy HDD 100 may be arranged between the sidewalls 204, to substitute for a real HDD. Each slot 125 and the corresponding cutout 146 communicate with each other to form a circular mounting hole, or circular clearance hole, to fix the dummy HDD 100 to the electronic device 200, as do the cutout 186 and the slot 165. The mounting holes 126 of the top plate 12 and the mounting holes 166 of the bottom plate 16 may be also used for fixing the dummy HDD 100 to the electronic device 200.

In this embodiment, the top plate 12, the first side plate 14, the bottom plate 16, and the second side plate 18 are connected head-to-tail to form the dummy HDD 100. When the dummy HDD 100 needs to be arranged in the electronic device 200, the dummy HDD 100 can be opened out into a rectangular frame. When not in use, the dummy HDD 100 can be folded into the smallest possible space for easy packing and transporting.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A dummy hard disk drive (HDD), comprising:
   a top plate;
   a bottom plate parallel to the top plate;
   a first side plate pivotably connected to a first side of the top plate and a first side of the bottom plate; and
   a second side plate pivotably connected to a second side of the top plate and a second side of the bottom plate;
   wherein the top plate, the first side plate, the bottom plate, and the second side plate are head-to-tail connected to form a rectangular frame with two opposite openings; the first and second side plates are operable to be rotated, such that, the first side plate is coplanar with the top plate, and the second side plate is coplanar with the bottom plate, and the frame is folded with first side plate and the top plate contacting second side plate and the bottom plate.

2. The dummy HDD of claim 1, wherein a length and a width of the frame are the same as those of an actual HDD, respectively.

3. The dummy HDD of claim 1, wherein the first side plate and the second side plate are substantially I-shaped and each comprise a bar and two connecting portions formed on opposite ends of the bar, each of the connecting portions is pivotably connected to the top plate and the bottom plate.

4. The dummy HDD of claim 3, wherein each of the connecting portions of the first side plate comprises a first pin and a second pin extending toward the other connecting portion of the first side plate and at opposite sides of the bar, the first side of the top plate defines two first pivot holes, the first side of the bottom plate forms a first protrusion defining two second pivot holes therein, the first pins of the connecting portions of the first side plate are pivotably engaged in the first pivot holes of the top plate, the second pins of the connecting portions of the first side plate are pivotably engaged in the second pivot holes of the bottom plate.

5. The dummy HDD of claim 4, wherein the second side of the top plate forms a second protrusion defining two third pivot holes therein, the second side of the bottom plate defines two fourth pivot holes, the first pins of the connecting portions of the second side plate are pivotably engaged in the third pivot holes of the top plate, the second pins of the connecting portions of the second side plate are pivotably engaged in the fourth pivot holes of the bottom plate.

6. The dummy HDD of claim 5, wherein two cutouts are defined in opposite ends of the first side of the top plate, the first side of the top plate forms a flange between the cutouts, the first pivot holes are defined in opposite ends of the flange.

7. The dummy HDD of claim 1, wherein the bottom plate is identical to the top plate in shape.

8. The dummy HDD of claim 1, wherein the first side plate is identical to the second side plate in shape.

9. An electronic device comprising:
   a base;
   two parallel sidewalls extending from the base; and
   a dummy hard disk drive mounted between the sidewalls;
   wherein the dummy hard disk drive comprises a top plate, a bottom plate parallel to the top plate, a first side plate pivotably connected to a first side of the top plate and a first side of the bottom plate, and a second side plate pivotably connected to a second side of the top plate and a second side of the bottom plate; the top plate, the first side plate, the bottom plate, and the second side plate are head-to-tail connected to form a rectangular frame with two opposite openings, when the dummy hard disk drive is removed from the sidewalls, the first and second side plates are capable to be rotated, such that, the first side plate is coplanar with the top plate, and the second side plate is coplanar with the bottom plate, and the frame is folded with first side plate and the top plate contacting second side plate and the bottom plate.

10. The electronic device of claim 9, wherein the bottom plate is identical to the top plate in shape.

11. The electronic device of claim 9, wherein the first side plate is identical to the second side plate in shape.

12. The electronic device of claim 9, wherein the first side plate and the second side plate are substantially I-shaped and each comprise a bar and two connecting portions formed on opposite ends of the bar, each of the connecting portions are pivotably connected to the top plate and the bottom plate.

13. The electronic device of claim 12, wherein each of the connecting portions of the first side plate comprises a first pin and a second pin extending toward the other connecting portion of the first side plate and at opposite sides of the bar, the first side of the top plate defines two first pivot holes, the first side of the bottom plate forms a first protrusion defining two second pivot holes therein, the first pins of the connecting portions of the first side plate are pivotably engaged in the first pivot holes of the top plate, the second pins of the connecting portions of the first side plate are pivotably engaged in the second pivot holes of the bottom plate.

14. The electronic device of claim 13, wherein the second side of the top plate forms a second protrusion defining two third pivot holes therein, the second side of the bottom plate defines two fourth pivot holes, the first pins of the connecting portions of the second side plate are pivotably engaged in the third pivot holes of the top plate, the second pins of the connecting portions of the second side plate are pivotably engaged in the fourth pivot holes of the bottom plate.

15. The electronic device of claim 14, wherein the first side of the top plate defines two arc shaped slots, the bar of the first side plate defines two arc shaped cutouts adjacent to the connecting portions respectively, each of the slots and the corresponding cutout together form a circular mounting hole to fix the dummy hard disk drive to the electronic device.

16. The electronic device of claim 14, wherein the first side of the bottom plate defines two arc shaped slots, the bar of the second side plate defines two arc shaped cutouts adjacent to the connecting portions respectively, each of the cutouts and the corresponding slot together form a circular mounting hole to fix the dummy hard disk drive to the electronic device.

17. The electronic device of claim 14, wherein an inner wall bounding one of the third pivot holes of the top plate defines a first positioning slot, and a second positioning slot angled about 90 degrees from the first positioning slot, a first raised portion extends on a circumference of one of the first pins of the connecting portions of the second side plate, the first raised portion of the second side plate is engaged in the first positioning slot when the dummy hard disk drive is a rectangular frame.

18. The electronic device of claim 17, wherein the first raised portion of the second side plate is engaged in the second positioning slot when the dummy hard disk drive is folded.

* * * * *